US007725590B2

(12) United States Patent
Sedukhin

(10) Patent No.: US 7,725,590 B2
(45) Date of Patent: May 25, 2010

(54) WEB SERVICES BROKER

(75) Inventor: Igor Sedukhin, Smithtown, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1510 days.

(21) Appl. No.: 10/418,630

(22) Filed: Apr. 18, 2003

(65) Prior Publication Data

US 2004/0030627 A1 Feb. 12, 2004

Related U.S. Application Data

(60) Provisional application No. 60/374,034, filed on Apr. 19, 2002.

(51) Int. Cl.
*G06Q 40/00* (2006.01)
(52) U.S. Cl. .................. 709/230; 709/201; 709/213; 709/246; 705/35
(58) Field of Classification Search ............ 60/160, 60/801; 75/35; 709/203, 219, 231; 705/35
See application file for complete search history.

(56) References Cited

U.S. PATENT DOCUMENTS

| | | | |
|---|---|---|---|
| 5,991,306 A * | 11/1999 | Burns et al. ............. | 370/429 |
| 6,311,269 B2 | 10/2001 | Luckenbaugh et al. | |
| 6,430,624 B1 | 8/2002 | Jamtgaard et al. | |
| 6,453,237 B1 | 9/2002 | Fuchs et al. | |
| 6,672,775 B1 | 1/2004 | Narayanaswami | |
| 6,684,087 B1 | 1/2004 | Yu et al. | |
| 6,687,745 B1 | 2/2004 | Franco et al. | |
| 2001/0032273 A1 * | 10/2001 | Cheng ...................... | 709/249 |

FOREIGN PATENT DOCUMENTS

WO     WO 00/77653 A1     6/2000

OTHER PUBLICATIONS

Open Market Announces Content Server™ Enterprise Edition as reported in PR Newswire, Mar. 5, 2001 p. 1.*
http://www.w3.org/TR/wsdl, retrieved by Examiner Jan. 7, 2009, dated Mar. 15, 2001.*
PCT Written Opinion of the International Searching Authority in International Application No. PCT/US03/12272 filed Apr. 18, 2003 (4 pages), Mailed Apr. 19, 2004.
"Web Service Made Easier, The Java APIs and Architectures for XML" Sun Microsystems, Oct. 31, 2001 Revision 2, 29 pages.

(Continued)

*Primary Examiner*—Kirsten S Apple
(74) *Attorney, Agent, or Firm*—Baker Botts L.L.P.

(57) ABSTRACT

A method for providing a web service broker includes providing an interface between an enterprise and at least one of a service client and a service provider. The service client discovers web services on a service registry and uses the corresponding web services from the service provider. Communication is provided between the enterprise and the at least one of the service client and the service provider. Information from or to the enterprise is converted to a form that is appropriate for the at least one of the service client and the service provider. Additionally or alternatively, information from or to the at least one of the service client and the service provider is converted to a form that is appropriate for the enterprise.

21 Claims, 7 Drawing Sheets

OTHER PUBLICATIONS

Benatallah B et al: "Declarative composition and peer-to-peer provisioning of dynamic Web Services" Proceedings 18th International Conference on Data Engineering IEEE Comput. Soc Los Alamitos, CA, USA, Mar. 1, 2002, pp. 297,308.

Communication pursuant to Article 96(2) EPC, Application No. 03 816 940.5-1238, 4 pages, Jan. 18, 2007.

* cited by examiner

WEB SERVICES BROKER

REFERENCE TO RELATED APPLICATION

This application claims the benefit of Provisional application Serial No. 60/374,034 filed Apr. 19, 2002, the entire contents of which are herein incorporated by reference.

BACKGROUND OF THE DISCLOSURE

1. Field of the Disclosure

The present disclosure relates to web services and, in particular, to a web services broker.

2. Description of the Related Art

One element for the next generation of e-business systems is collaboration. Presently, collaboration is narrowly addressed by a multitude of e-business automation applications: business-to-customer (B2C) or customer-to-customer (C2C) interaction, business-to-business (B2B) integration, business logic componentization, business process orchestration, legacy systems integration, etc. All of these applications have something in common in that they collaborate electronically to create an infrastructure for certain business to take place. However, a limitation of this is the lack of common global framework (one that everybody agrees to use) under which all those distributed applications (services) can interoperate and discover each other. This limitation causes a lot of investment and effort to go into creation of appropriate purpose-oriented collaboration solutions, which usually are closely coupled, platform/technology/vendor/implementation/language-dependent, difficult to reuse in a uniform way, may not be Internet ready, etc. Creating a new collaboration point usually increases overall system complexity, reduces reliability and requires even more resources for maintaining and extending such systems.

SUMMARY

A web service broker method comprises providing an interface between an enterprise and at least one of a service client and a service provider, the service client discovering web services on a service registry and using corresponding web services from the service provider, communicating between the enterprise and the at least one of the service client and the service provider and performing at least one of a) converting information from/to the enterprise to a form appropriate for the at least one of the service client and the service provider and b) converting information from/to the at least one of the service client and the service provider to a form appropriate for the enterprise.

A computer recording medium includes computer executable code for implementing a web service broker. The computer recording medium comprises code for providing an interface between an enterprise and at least one of a service client and a service provider, the service client discovering web services on a service registry and using corresponding web services from the service provider, code for communicating between the enterprise and the at least one of the service client and the service provider and code for performing at least one of a) converting information from/to the enterprise to a form appropriate for the at least one of the service client and the service provider and b) converting information from/to the at least one of the service client and the service provider to a form appropriate for the enterprise.

A programmed computer system for performing a web service broker method comprises providing an interface between an enterprise and at least one of a service client and a service provider, the service client discovering web services on a service registry and using corresponding web services from the service provider, communicating between the enterprise and the at least one of the service client and the service provider and performing at least one of a) converting information from/to the enterprise to a form appropriate for the at least one of the service client and the service provider and b) converting information from/to the at least one of the service client and the service provider to a form appropriate for the enterprise.

BRIEF DESCRIPTION OF THE DRAWINGS

A more complete appreciation of the present disclosure and many of the attendant advantages thereon will be readily obtained as the same becomes better understood by reference to the following detailed description when considered in connection with the accompanying drawings, wherein.

DETAILED DESCRIPTION

Figure 1:
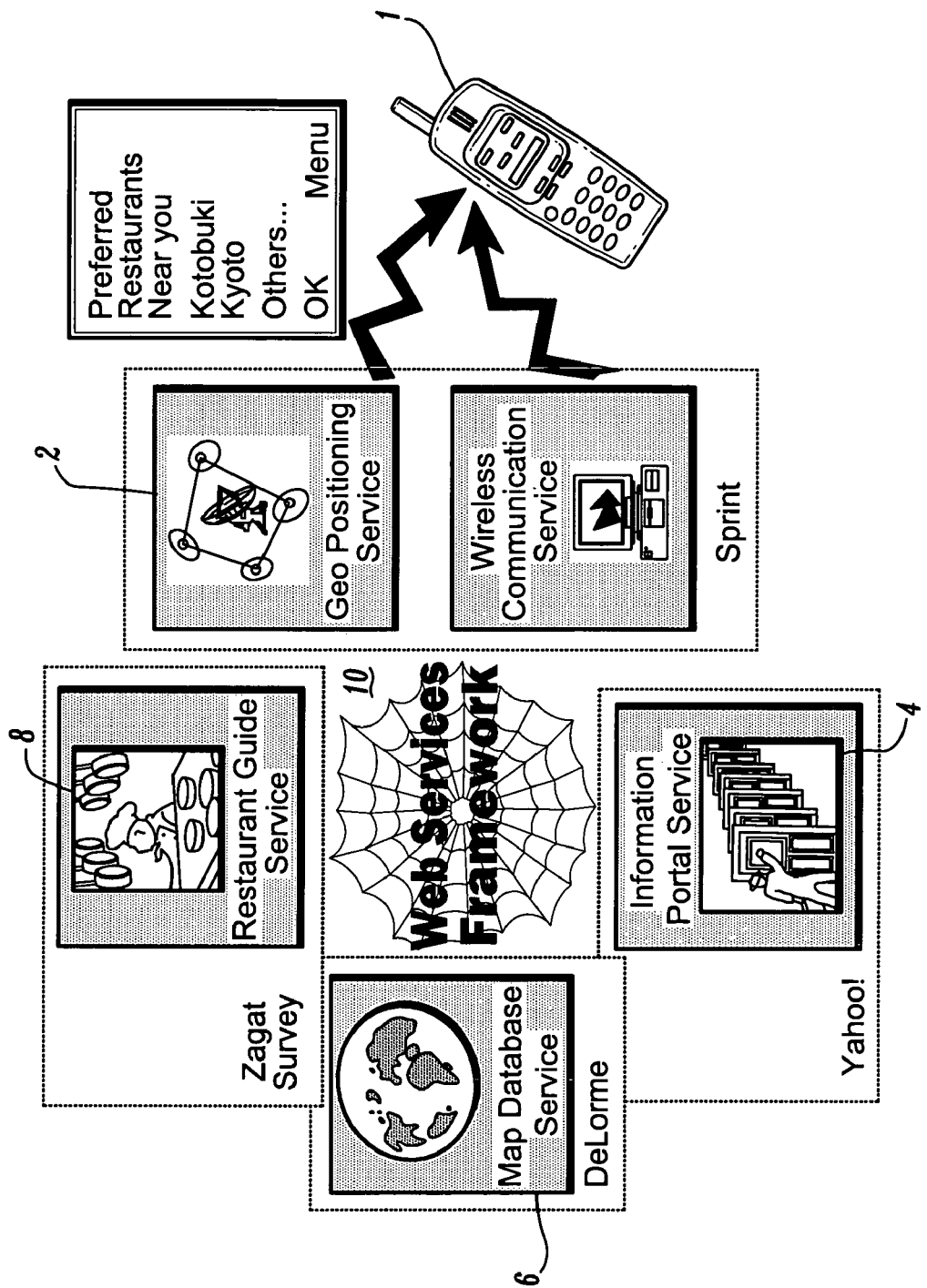
FIG. 1 is a block diagram of an example of independent business interaction.

In describing embodiments of the present disclosure illustrated in the drawings, specific terminology is employed for the sake of clarity. However, the present disclosure is not intended to be limited to the specific terminology so selected and it is to be understood that each specific element includes all technical equivalents which operate in a similar manner.

Figure 6:
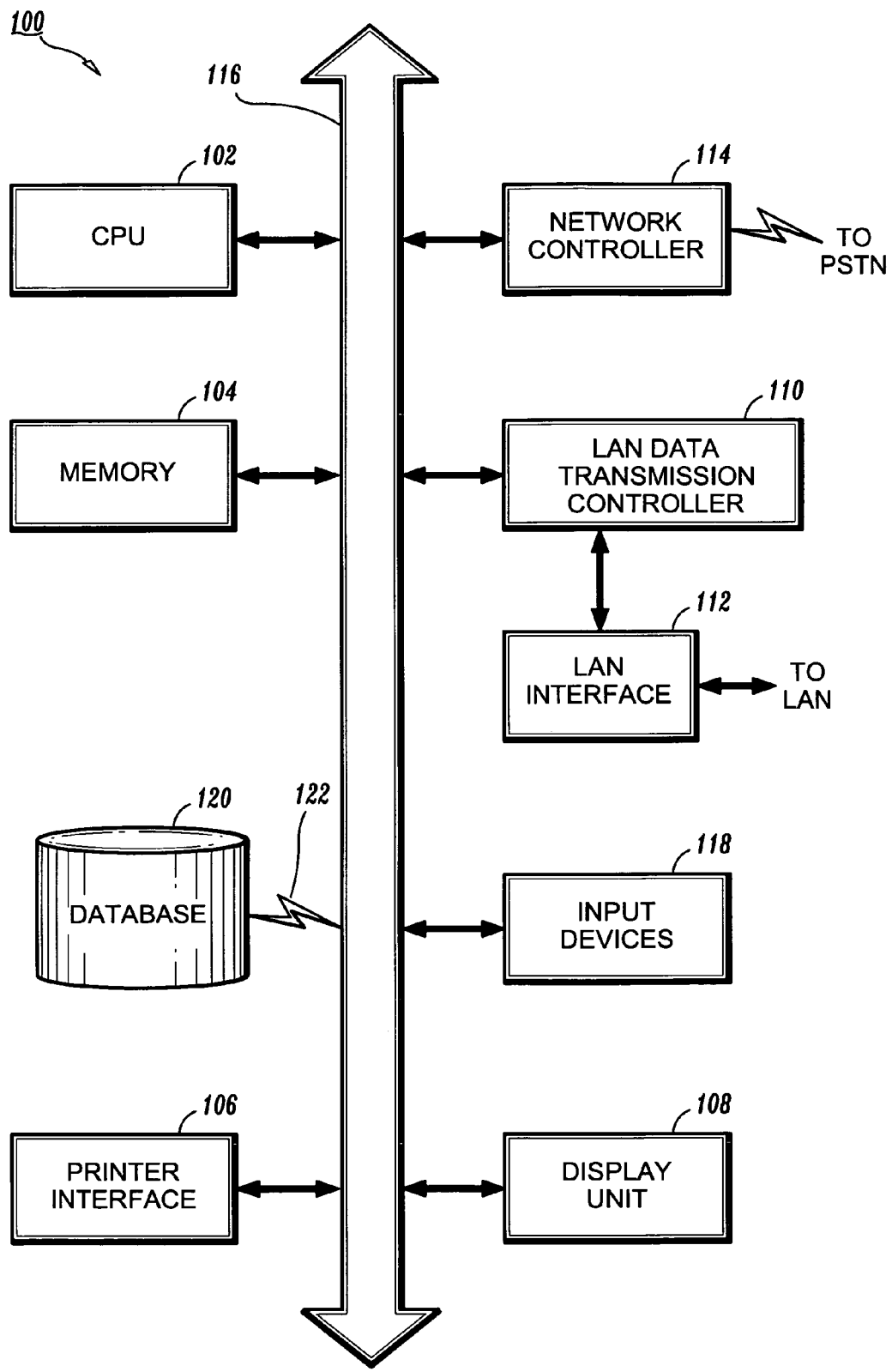
FIG. 6 is a block diagram of an example of a computer system capable of implementing embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

As shown in FIG. 6, the computer system referred to generally as system 100 may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

As the need for an unbiased global electronic collaborative environment has come to be realized, a new generation of e-business automation systems and appropriate infrastructure are being designed. The new approach is known as "Web Services". The "Web" refers to commonplace networking (from LANs to Wireless) and "Services" refers to electronic interfaces into distributed applications.

Web Services are programmatic interfaces to electronic business systems that are defined and operate based on various industry standards including, for example, XML-based standards, ensuring interoperability.

Each WS has a contract including a technical contract and a business contract. The technical contract defines operations and data types used to carry out those operations. The technical contract also defines protocols and appropriate communication modes. The business contract defines business-related metadata around the service. For example, category or taxonomy, support phone number, Service Level Agreements, licensing model, etc.

Examples of Web Services (WS) may include a stock quote accessible with a Universal Resource Locator (URL), a product catalog published on the Internet, a Simple Mail Transfer Protocol (SMTP) message channel, a Simple Object Access Protocol (SOAP) based authentication agent, a CORBA object, etc. All of these are network-accessible components that implement certain functionality. If appropriately described and marshaled, any of the above components can be discovered, used and aggregated into, for example, a dynamic business automation system.

In other words, the information technology (IT) industry has evolved from machine code to programming languages, then to client-server programming, then to object-oriented component models. It is now evolving into flexible, loosely coupled service-based distributed applications that dynamically discover, use and contract each other. In other words these applications are dynamically "assembled" from distributed (and largely independent) parts (services) at runtime to achieve a certain goal. They can be assembled according to a defined criteria (for example, "fastest way to get it done") and they can dynamically reconfigure at runtime if, for instance, one of the services does not meet a quality requirement.

In addition to the changes occurring to business automation systems with this new trend, user interfaces and interaction devices are also going to change. User interfaces can be built to work in the WS environment so that they can discover and invoke services according to user actions. Interaction devices can provide support with appropriate hardware, software and communication on infrastructure.

FIG. 1 depicts an example of a collaboration of independent businesses interacting with each other to display, on a screen of a wireless device 1, a list of preferred restaurants that are near the user's current location. In this example, each business does what it does best. For example, the Wireless Communication and Geo Positioning Services 2 are provided by a communication infrastructure company for performing certain services including determining a geographic position of the wireless user. Information Portal 4 maintains user profiles and formats the information in a preferred way. Map Database Service 6 translates the geographic position of the wireless user into addresses and provides information including the proximity of the user to restaurants. Restaurant Guide 8 provides information including restaurant descriptions and rankings. Web Services 10 provide the framework for this dynamic business process and user interaction to take place without creating static B2B relationships or tightly coupled technological implementation.

Web Services is a public standards-based approach, and it has become possible to start globalizing e-business systems to that extent. To this end, several public organizations have been created, where the joint effort of several industry leaders has resulted in a set of standards like XML, UDDI, WSDL, etc. (as well as legacy standards like HTTP, TCP/IP, etc.)

WS combines multiple, largely unrelated, standards, organizations, software and hardware infrastructure builders into one global unbiased framework. It thus becomes possible to create collaborating electronic business systems in a meaningful way. That is, it does not require proprietary agreements and tight integration of the automation systems for two parties to collaborate electronically.

WS creates an environment to register services in a very generic and descriptive way, yet it is comprehensive and IT-enabled. It also makes services available (e.g., publish it). It also allows services to be found (wherever they may be), interrogate details needed to use it and make the service an asset (discover/subscribe on it). Subscription may also sometimes be referred to as binding to a service. WS also allows the use of the service (invoking the service).

WS are platform, programming language, vendor, technology and implementation model agnostic. WS are dynamically discovered, contracted with, bound to, and invoked. WS are loosely coupled, universally marshaled and decentralized. WS also can interact via commonplace networking using coarse-grained messaging. This means no dependency on the evolution of communication infrastructure. In addition, it is ubiquitous. There are no significant performance concerns due to the amount of information being exchanged in one fragment and granularity of the services.

Figure 2:
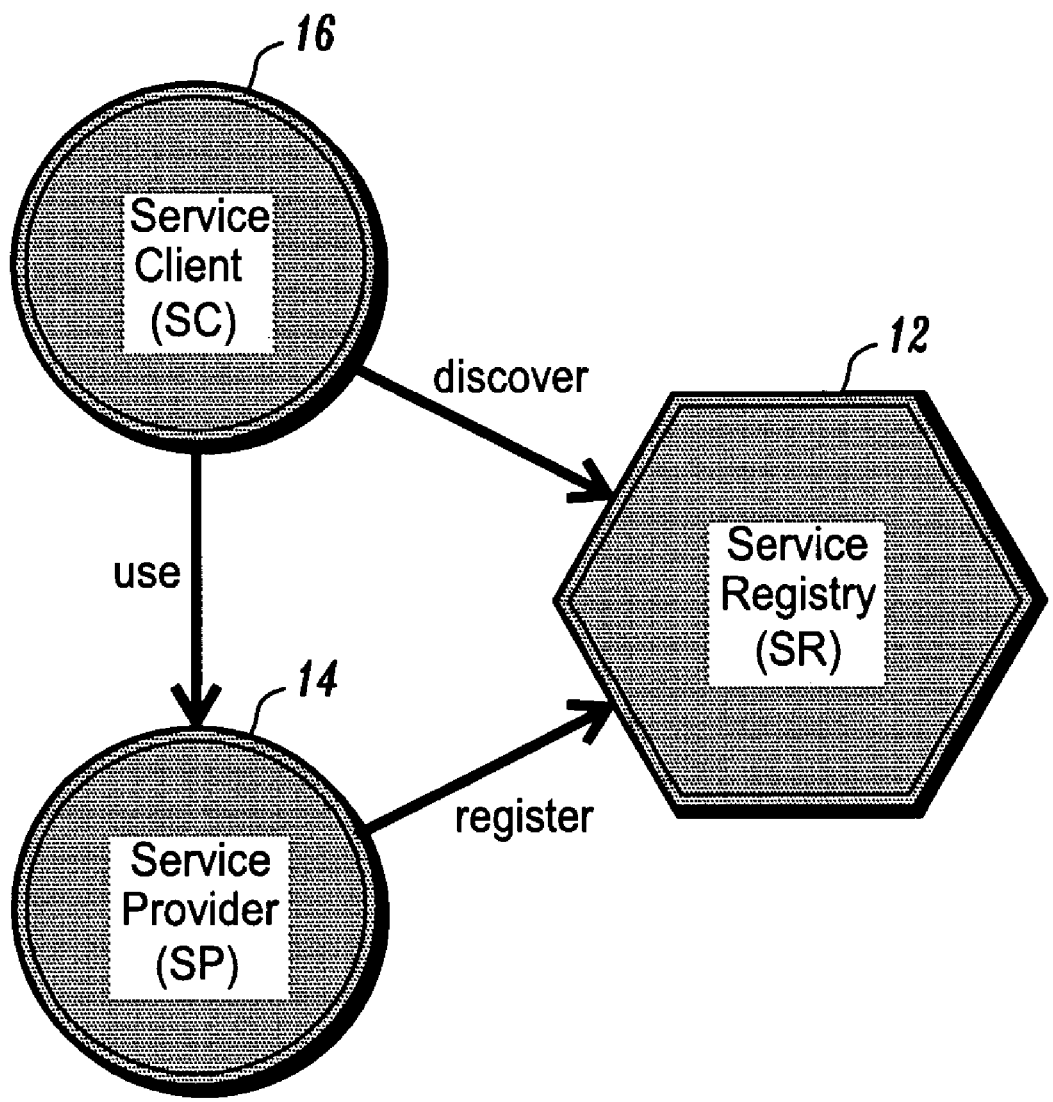
FIG. 2 is a block diagram of a Web Services concept.

Now, more specifically, the relationships between each of the elements (and their roles) for providing a successful WS environment are depicted in FIG. 2. The elements include public, global and independent Service Registry (SR) 12, Service Providers (SP) 14 and Service Clients (SC) 16. Service Providers 14 register their services with Service Registry 12. Service Clients 16 can then discover and use those services.

WS is based on XML descriptions and messaging in the commonplace-networking environment. XML is a very general way to make information universal for Internet-era deployment. WS is a framework of XML-based standards that have special meaning and address certain areas. These areas and some of the standards for each include Service Registration (for registering with SR 12): UDDI (Universal Discovery, Description and Integration), Service Description: WSDL (Web Services Description Language), Service Advertisement: ADS (Advertisement and Discovery of Services), Service Addressing: URL (Universal Resource Locator), JNDI name, specific LAN (Local Area Network) address, etc., Service Invocation: SOAP (Simple Object Access Protocol), URL with parameters, WebDAV, etc. Service Data Abstraction and Data Marshalling: XML (Extensible Markup Language), XML Schema, etc., Presentation and Interaction: DHTML (Dynamic HyperText Markup Language), WML (Wireless Markup Language), PDF, VRML, etc., Business-to-Business Process Integration: RosettaNet, ebXML, etc., Common Communication Protocols: HTTP (HyperText Transfer Protocol), FTP (File Transfer Protocol) and SMTP (Simple Message Transfer Protocol), other: MQ Series, WAP, etc., Common Security: SSL (Secure Services Layer), X.509(Digital Certificates), XSIG (XML Signature), etc. and Common Networking: TCP/IP (Transport Communication Protocol/Internet Protocol), DNS (Domain Name Service), etc.

UDDI is used to communicate to SR 12 which holds business contracts for multiple services. SR 12 call be setup on a corporate/department level and/or be a public registry. WSDL is used to express the technical contract for a service. WSDL defines operations, refers to data type definitions and specifies protocols and communication details for a service. XML schema is used to define hierarchical data types used in service operations. XML holds values in SOAP messages between a client and a service. XML contents are according to XML Schema. HTTP (and TCP/IP) is used to carry the messages between parties. HTTP is a primary, ubiquitous communication method for WS.

WS brings these together and adds new standards and concepts to create a framework for flexible, distributed applications and services. WS is also a very flexible environment. For example, new communication protocols may be introduced without necessarily changing services and their applications. WS applications are isolated well enough from the specifics to allow the underlying infrastructure to evolve. In addition, WS does not standardize what services would or could do and how. Instead, WS provides a way to describe, publish and use the services.

WS applications operate in a certain way to provide user services. This operation is a part of the WS framework. The operation includes carrying out registration, publishing, discovery/subscription and invocation of a service.

To Register and Discover, WS interact with the at least one SR 12 over the HTTP (with or without SSL) using Simple Object Access Protocol (SOAP), which is an XML messaging protocol. SOAP is an envelope definition that holds requests and replies between a client and a service. The Universal Discovery, Description and Integration (UDDI) standard defines the content of the communication with the SR 12.

UDDI documents describe businesses and their services (electronic or not). Each business can maintain a registration entry with SR 12 that consists of a UDDI document hierarchy. The hierarchy may include White Pages which define the business identity; Yellow Pages which categorize business aspects (like business taxonomy, serviced part D-U-N-S numbers, etc.); and Green Pages which describe technical details of the WS (service binding template). Green Pages may refer to the service directly (like a URL of a parts catalog) or embed/refer to a more detailed specification of WS interfaces, data types, security constraints, etc.

SR 12 may be global, being replicated across several repositories. Examples of global SRs include uddi.microsoft.com or uddi.ibm.com. SR 12 may also be shared within a company or among several participants via, for example, a delegated or private repository.

When registering, the Service Provider (SP) 14 submits appropriate UDDI entries using SOAP UDDI APIs to the SR 12. The submission may also include WSDL information and/or a reference to WSDL information in the form of, for example, a URL. Registration is a static step in the sense that once information is submitted to SR 12, the SR 12 maintains the information. Although entries may be changed, revoked and/or resubmitted, the SR 12 does not generally dynamically request any changes, revocations, resubmissions, etc. from the registrant when, for example, a SC 16 runs a query to discover services.

When discovering available services, SC 16 retrieves UDDI documents by using SOAP UDDI APIs to request the information from the SR 12. The SC 16 may include selection criteria in the requests for retrieving records about desired businesses and their services. When the request is received from the SC 16, SR 12 runs an appropriate query against its registration repository to find any suitable registered businesses and their services. Discovery is a dynamic process.

When publishing, SP 14 makes its interfaces available to connect or communicate to. For example, SP 14 may start listening for SOAP requests on a certain URL. At this point, SP 14 may also make WSDL information available if, for example, it was referenced in the UDDI entry earlier during registration. WSDL may be dynamically generated depending on current WS parameters like, for example, a communication protocol that needs to be used, etc. This is a dynamic process. Service may be disabled, enabled and reconfigured at any time. SC 16 may intelligently react to this by, for example, switching to another available service, using a different communication protocol, marshalling data accordingly, etc.).

When subscribing (binding), SC 16 interprets the WS description using information in the UDDI and the WSDL documents when available. SC 16 creates necessary interface representation, data marshalling stack, communication pipe, authentication realm, etc. which may be used for service invocation. Subscription is generally a dynamic, reconfigurable process, but it may also become static, if, for example, tight language or technology integration is required.

When invoking, SC 16 chooses a WS interface, builds necessary parameters, makes a call and then interprets a result. This is very similar to invoking a method on an OO (Object Oriented) component. In certain cases, such as tight language-to-WS binding, it may be an OO component invocation. The difference is, though, in the process of flexible, Web-ready communication, data marshalling, authentication, etc., details of which would usually be hidden from the usage pattern.

The types of WS may vary and may generally be qualified into three different types, depending on the control and data flow that defines their operations. Usually one e-business would have a mix of different types of WS depending on the purpose they serve.

One type of WS would be an Information Source. For example, A publishes information at a certain address and makes changes to it, B subscribes to the information source, retrieves content and pools for changes. In this case, A is passive and B is active. Data flows from A to B.

Another type of WS might be a Messaging Queue. For example, A establishes an incoming communication channel at a certain address, B establishes an outgoing communication channel and pushes information into it, A listens and accepts information from the channel. In this case A is passive and B is active, data flows from B to A.

Another type of WS might be a Component Service. For example, A exposes a set of interfaces at a certain address and implements processing of requests made to those interfaces, B invokes interfaces, passes and receives information in requests and replies. In this case A is passive, B is active, data flow is bi-directional.

Making a product catalog available on the Web would most likely be considered the Information Source type WS. B2B purchase/invoice processing would most likely be considered the Messaging Queue type WS. Contacting a geo positioning service for your exact location would most likely be considered the Component Service type WS.

Any kind of collaborative e-business automation system can be built using WS of the three types listed above. It would be sufficient to have these types of WS types to cover any type of Web collaboration.

As will be appreciated from the above, the WS environment is an efficient and versatile framework for electronic collaboration of all kinds. However, to make full use of its powers, it should be related to existing technologies, infrastructures, business processes, etc. This is particularly true since it can be said that this is the beginning of this IT evolution cycle, of laying the foundation and putting the technology framework in place. To do this, a system should leverage accumulated knowledge, reuse and extend existing systems to bring them to the next level of deployment, which will make them more universal. To address these concerns, a Service Broker (SB) such as that described herein can be introduced into the WS concept described above.

Figure 3:
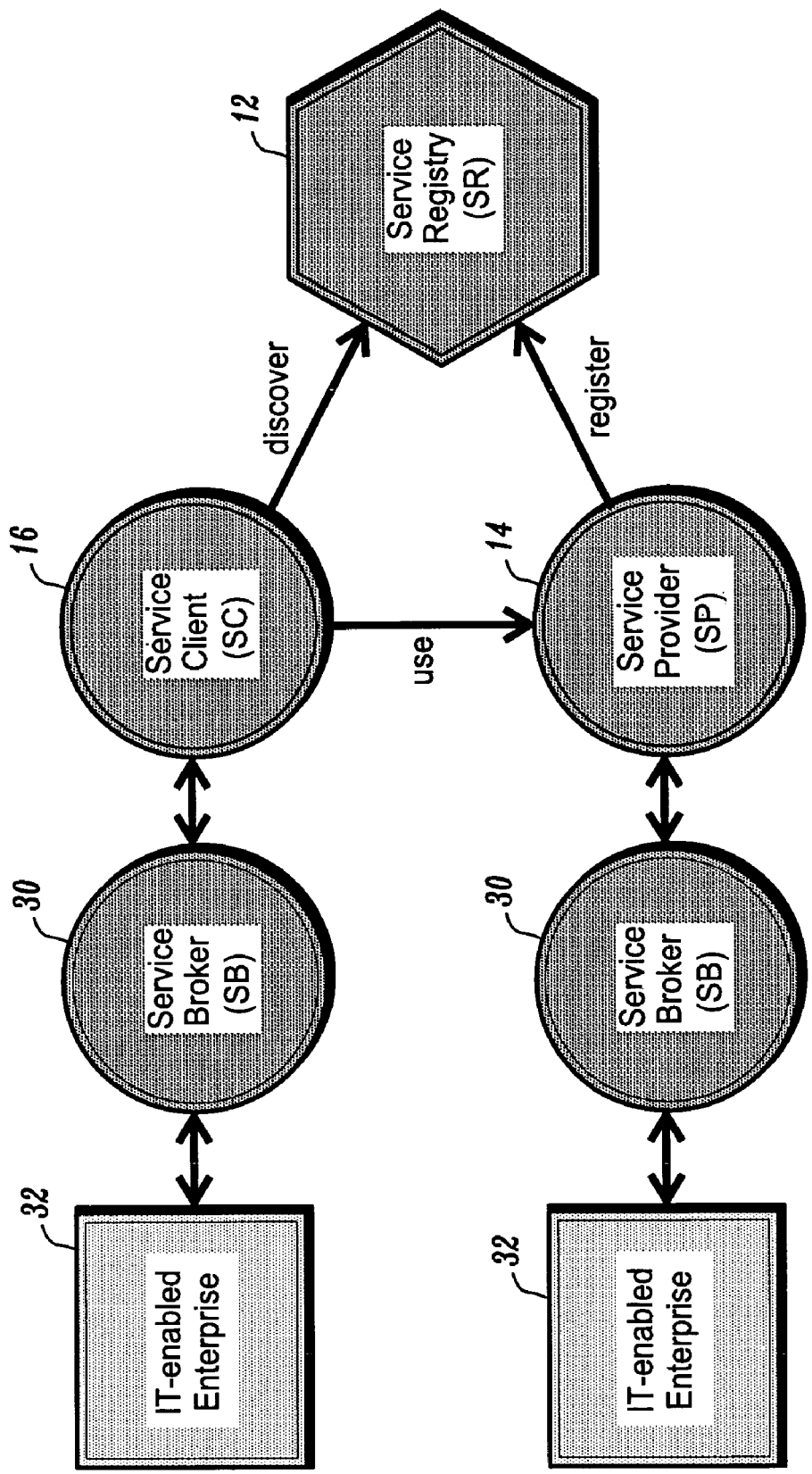
FIG. 3 is a block diagram of a Web Services concept with a Service Broker.

FIG. 3 depicts a Service Broker applied to the WS concept described above with respect to FIG. 2. As shown in FIG. 3, the Service Broker (SB) 30 is the WS platform for IT-enabled enterprises 32. SB 30 analyzes a service implementation model and automatically creates technical and business contracts that comply to the above-noted standards. SB 30 submits business contracts to the SR 12 of choice and then listens to SOAP requests, processes the SOAP requests and relays calls to the actual implementation in, for example, Java or C++.

SB 30 may perform many different functions and roles. For example, the SB 30 may provide a technology foundation for WS activities. This might include a Web communication layer, XML data marshalling, SOAP request processor, UDDI communication APIs, WSDL binding, etc. The SB 30 may integrate enterprise technologies to (1) unify OO models for data and logic, (2) coordinate between separate technologies, (3) federate sub-infrastructures (like EJB or CORBA). SB 30 may also provide tools and facilities for deploying existing (integrated) systems, parts and components as WS. This might include registration of a WS, publishing it, accepting invocation requests and translating all that back into original implementation activities. SB 30 may also integrate external WS to discover WS in the SR 12 and subscribe to the WS. This may mean binding WS to any required technology, language or model in such a way that it would be natural for the target application to use WS in appropriate terms. A WS integration facility function may also be provided to isolate dynamically selectable and configurable details like data marshalling and communication protocols from the target application. SB 30 may also provide tools and facilities for WS aggregation. This may include integration of WS, representing them in the common process component model, a process modeling tool (e.g., UML), a coordinated process execution runtime (Workflow-like) and dynamic WS deployment facility. SB 30 may also provide a WS Management Console (WSMC). The WSMC might incorporate a set of tools needed to define and submit/change UDDI entries, maintain local registration replica and common business information, redeploy (move) entries from one SR repository to another, include and exclude services, configure communication protocols, impose security, etc. The SB 30 may also provide selective logging and quality of service (QoS) analysis.

In order to successfully interface existing systems and not replicate efforts already invested in base technologies, SB 30 utilizes an intermediate infrastructure layer and integrated services. This allows, for instance, business logic implemented as EJBs and hosted in a scalable Application Server to be deployed as a set of WS.

To deploy or use a WS, technology and implementation details may be hidden. SB 30 provides "technology insulation" with isolation and abstraction facilities that are based on standards, XML data marshalling, common networking, etc. These facilities coordinate, map and translate between actual implementation and abstract WS representation. For instance, a SOAP message may be translated into a method call on an EJB object, and the result can then be represented and returned as XML generated according to certain agreed schema.

To make SB 30 readably usable, visual tools can be used to make transition to WS smooth and linear. Tools are still provided even after the transition happens, since they can be used for deployment of new WS.

The Tools are easy to use and intuitive, relying largely on automated deployment and integration facilities provided by SB 30. For example, to deploy an EJB object as a WS, one may browse to a visual Web representation (page) of that object and request its registration and publishing as a WS right from the Web page. The rest of the process will be carried out automatically by the SB deployment facility based on the OO model of the EJB object and its attributes. To subscribe to a WS, a user can visually search or browse registration information, select a necessary service and choose to subscribe to it. The request would then be passed to a SB integration facility that would interrogate UDDI, and further WSDL, to create appropriate OO model of the WS and register it in a catalog.

Figure 4:
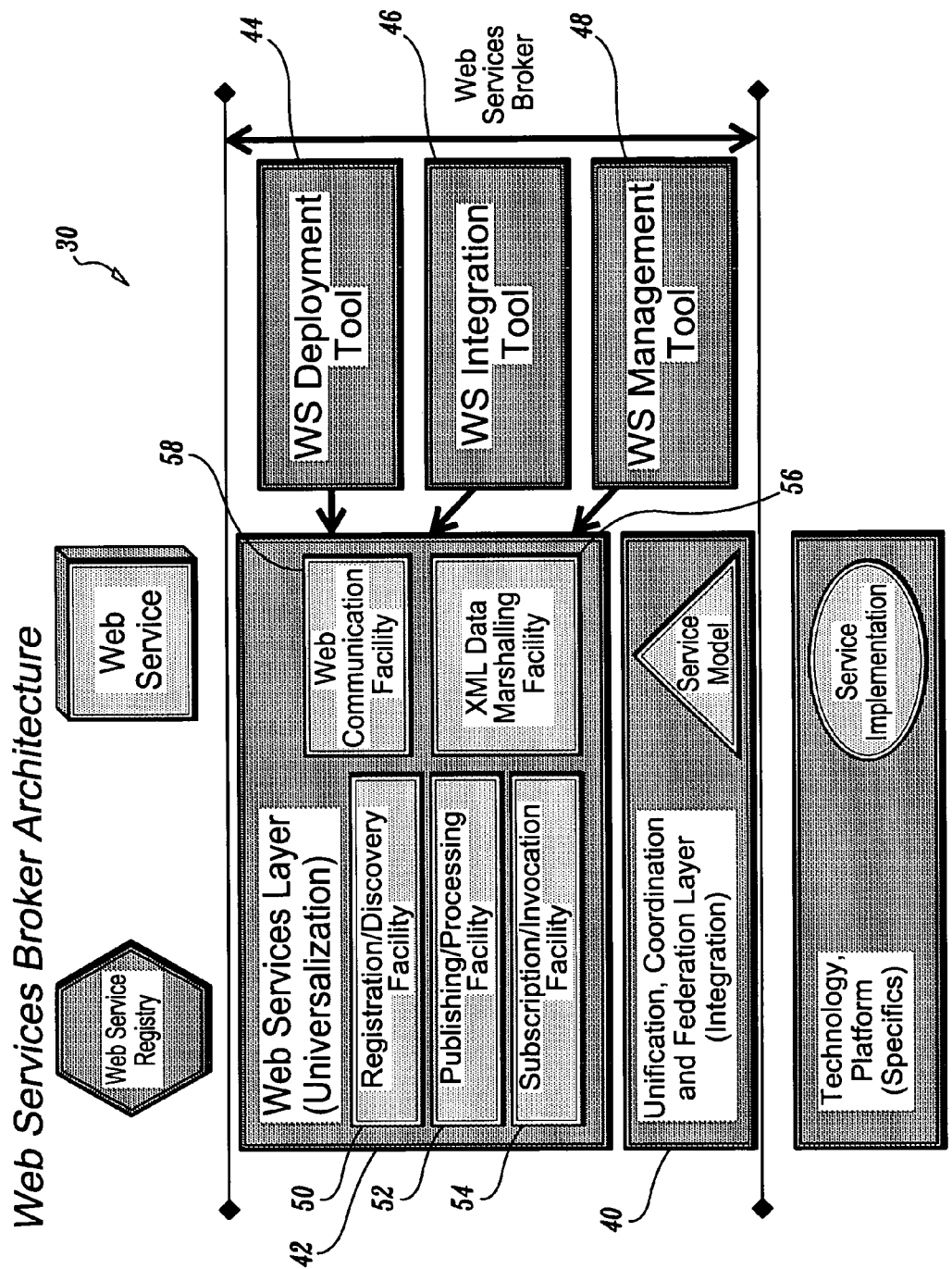
FIG. 4 is a block diagram of a Web Services Broker Architecture.

An example of the core of a WS Broker (SB 30) according to an embodiment of the present disclosure is shown on FIG. 4. The SB 30 may include the following main components, Unification, Coordination and Federation Layer (Integration) 40, Web Services Layer (Universalization) 42, a WS Deployment Tool 44, a WS Integration Tool 46 and a WS Management Tool 48. Each component will now be described in more detail.

The Unification, Coordination and Federation Layer 40 is responsible for hosting a unified OO model of specific technologies and implementation (e.g., relational DB or mainframe green screens or an EJB object, etc.); mapping (binding) between unified OO model and specific technology or language (to and from languages like C++, Java, or technologies like ODBC); coordinating execution and environment context between activities in particular technologies, implementations and platforms (for instance, span transactional control across relational DB and CICS, or in C++ code subscribe to an event originating from an EJB container); and federating sub-infrastructures (like EJB, COM or CORBA) into one point of access and control.

The Web Services Layer 42 is responsible for abstraction of the unified OO models hosted in layer 40 as WS and isolating them from any technology and implementation details. Layer 42 carries out all standard WS operations such as registration, publishing, discovery, subscription and use. The Web Services Layer 42 includes various facilities that form a Universalization Layer. The facilities forming the Universalization Layer include Registration/Discovery Facility 50, Publishing/Processing Facility 52, Subscription/Invocation Facility 54, XML Data Marshalling Facility 56 and Web Communication Facility 58.

Registration/Discovery Facility 50 implements automated procedures for registering a component (both data and logic) represented by a universal OO model as a WS and/or finds WS according to Supplied selection criteria. Facility 50 contacts the SR 12 using SOAP over the HTTP, generates and submits appropriate UDDI documents or runs a selection query and interrogates UDDI documents that describe the WS. Facility 50 also implements procedures for changing the registration information, maintaining business-related entries, revocation of registration entries and resubmitting to another SR repository. Facility 50 also maintains a replica (catalog) of all the registration entries and their relationships to the original OO model of components in a registration database (not shown).

Publishing/Processing Facility 52 takes care of generating WS technical description (e.g., WSDL) and uses Web Communication Facility 58 to make WS interfaces available for access. For example, Facility 52 might register a SOAP listener for a certain URL to represent WS to the Internet client. Facility 52 can also accept requests and initiate necessary activities (process requests) in the original OO model of the WS hosted in the Integration Layer. Facility 52 uses XML Data Marshalling Facility 56 to properly represent data for each side.

Subscription/Invocation Facility 54 interrogates technical details about the WS (e.g., WSDL), creates a unified OO model for it and makes it one of the assets available to the Integration Layer 40. Facility 54 then translates activities related to the WS OO model into actual external WS invocation according to the WSDL description. Facility 54 uses XML Data Marshalling Facility 56 to convert data to and from XML and OO representation, and it uses Web Communication Facility 58 to propagate requests to the external WS and receive replies. It should be noted that the Integration Layer does the actual binding of the integrated (subscribed) WS to the particular technology or language. Depending on the target application, Integration Layer 40 can create static or dynamic binding to the unified OO model of the WS.

XML Data Marshalling Facility 56 is used to abstract OO data models and data types in XML. Facility 56 provides bi-directional translation between the unified OO model used by the Integration Layer and the universal XML data representation. Facility 56 also transcodes data element relationships appropriately. For example, Facility 56 can represent an object that contains another object as nested elements in XML. XML Data Marshalling Facility 56 supports multiple standards that represent data schemas and data types. Facility 56 is also used for template-based data marshalling (mapping) using, XSL Transformations language, which is becoming standard for that purpose.

Web Communication Facility 58 encapsulates connectivity and messaging technologies applicable to commonplace networking (e.g., the Web). Facility 58 ensures security of the communication channel, guaranteed delivery of messages, non-reputability, etc. Some public standards that are incorporated and supported include HTTP, FTP, SMTP, SSL, X.509 and XSIG. Additional commonly used communication mechanisms may also be provided such as MQ Series, MSMQ, WAP, etc.

The tools may include a WS Deployment Tool 44 which is a visual instrument (Web-based GUI) to view, browse and select components (data and logic) hosted in the Integration Layer and to make them available as WS. By default, Tool 44 deploys WS automatically with best suitable parameters, but also allows application of specific requirements including selection of published interfaces, security on the communication channel, type of invocation protocol, etc. WS Deployment Tool 44 uses Publishing/Processing facility 52 and Registration/Discovery Facility 50. WS Deployment Tool 44 may also be used to modify WS parameters at runtime and revoke WS.

Another tool, WS Integration Tool 46, is a Wizard-like visual process implementation that allows discovery of a WS according to certain criteria, and subscription to the selected WS. Tool 46 displays details needed to select an appropriate service when discovering WS and shows the final asset (OO model) hosted in the Integration Layer after subscribing to a WS. The WS Integration Tool 46 may use Registration/Discovery Facility 50 and Subscription/Invocation Facility 54.

Another tool, WS Management Tool 48 is the WS Management Console (WSMC). This tool contacts Publishing/Processing Facility 52 and Subscription/Invocation Facility 54 to interrogate runtime details about deployed and integrated WS. Tool 48 uses Registration/Discovery Facility 50 to monitor the SR 12. Generic runtime information about WS and SR 12 is displayed by WSMC. Tool 48 also generates QoS analysis reports for particular deployed or integrated WS and SR repository.

Another responsibility of the WSMC is to display and edit the registration database of common business entries and WS templates (UDDI-related) that are maintained by the Registration/Discovery Facility 50 to register business entry, register basic business services and information, move entries from one SR repository to another, etc.

Another service that SB 30 might perform is Web Services Aggregation and Assembly. It is not required to implement WS in a specific technology or language. As a transition occurs to the new IT paradigm of universally interfaced network based services, it will be found that most of the needed components for certain business process may already be readily available, and all it takes is to connect and coordinate between them and provide (implement) added value services where necessary. This process may be called WS Aggregation and Assembly. This is a high-level process that does not necessarily require knowledge of any particular technology or language, but rather, relies on knowledge of business process and business component relationships.

In addition to brokering between specific implementation and abstract WS representation, the present WS Broker may take the function of aggregation and assembly of new WS from the selected existing ones. To do this, external WS are integrated into a convenient OO model that can be easily manipulated. This can be done with the help of the WS Integration Tool 46. A Modeling Tool can be used to define aggregated WS OO model and lay out the execution sequences involving OO models of the integrated external WS components. There can be multiple execution sequences associated with aggregated WS activities, with each one being a workflow and defined in workflow terms using appropriate visual tools. Integration Layer 40 may host the aggregated WS OO model and workflow sequences. A Dynamic Web Service Deployment Facility can be used to automatically deploy aggregated WS. When an aggregated WS is used, a process execution runtime can carry out appropriate workflow sequences and invokes, where necessary, integrated external WS (via their OO models).

Note that there may still be a need, going forward, in the core function of SB applied in conjunction with the aggregation and assembly. For example, one may provide new added value WS based on hardware security transcoder and aggregate it with other existing external WS (like account DB or certificate authority) into a new, fast authentication WS.

Figure 5:
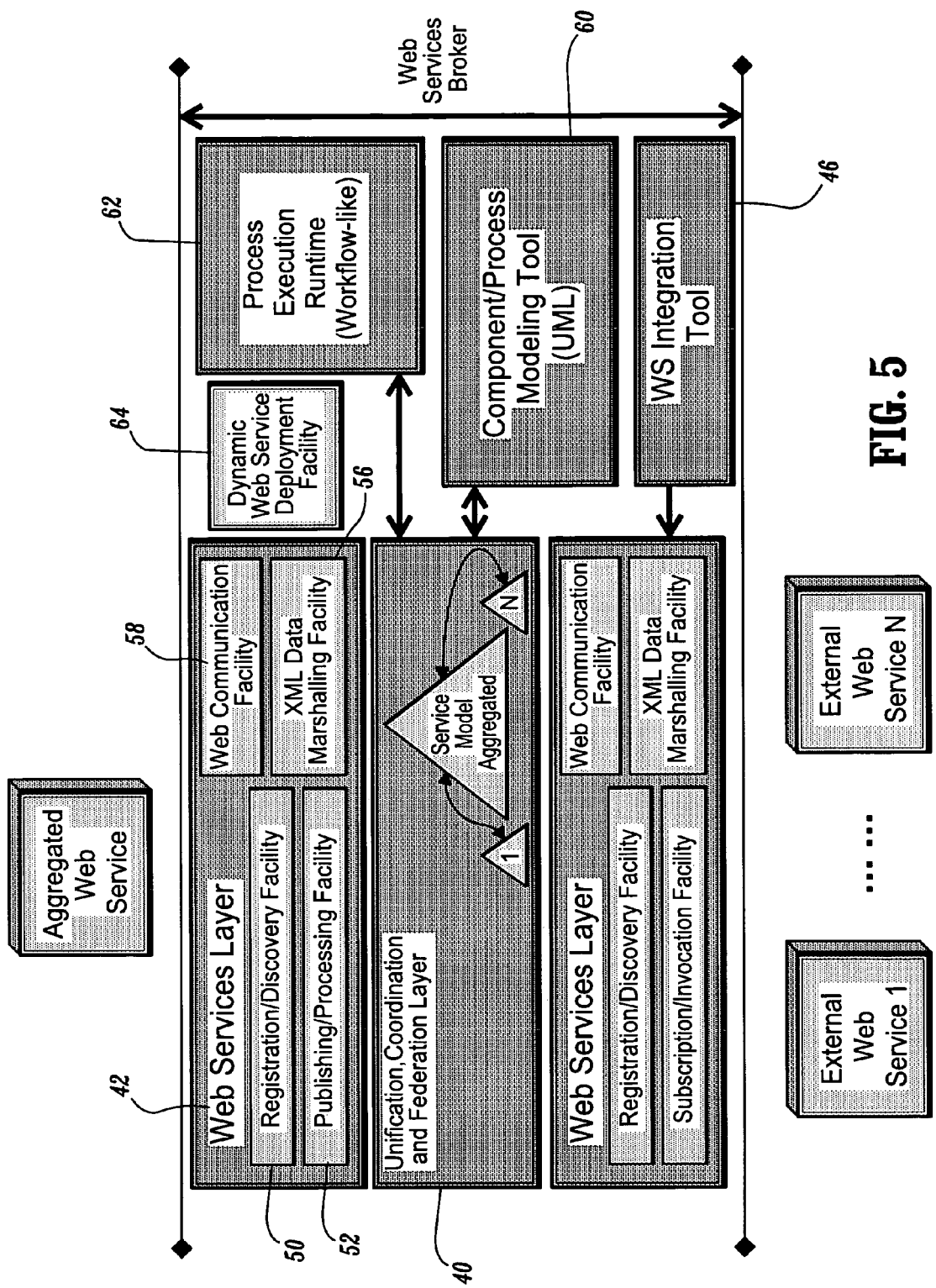
FIG. 5 is a block diagram of a Web Services Broker Architecture for aggregation and assembly.

FIG. 5 is a block diagram of a Web Services Broker Architecture (Aggregation and Assembly). The WS Aggregation and Assembly introduces three components to the core of SB 30. These components include Component/Process Modeling Tool (UML) 60, Process Execution Runtime (Workflow-like) 62 and Dynamic Web Service Deployment Facility 64.

The Component/Process Modeling Tool (UML) 60 is a visual instrument to define OO models and processing sequences by drawing diagrams and relationship maps of OO components. It may be, for example, a UML-based modeling tool that interfaces to the Integration Layer 40 to incorporate OO component models and deploy the final aggregated OO model and processing sequences. This tool may also be used to import back the aggregated OO model, edit and modify it, and then reflect changes to the Integration Layer 40.

Process Execution Runtime 62 takes processing sequences from the aggregated OO model hosted in the Integration Layer 40 and executes them in appropriate context and order. Process 62 synchronizes and schedules the execution to implement relationships originally designed in the Component/Process Modeling Tool 60.

Dynamic Web Service Deployment Facility 64 automatically deploys aggregated OO models of new service components as WS. Facility 64 implements default deployment processes that WS Deployment Tool 44(FIG. 4) would otherwise be used for, but in this case a decision about making an OO component a WS is based on dynamic recognition of the OO model (hosted by the Integration Layer 40) to be originally designed as an aggregated WS. Facility 64 is able to modify already deployed aggregated WS when the related OO model changes (for example, with a modeling tool).

Figure 7:
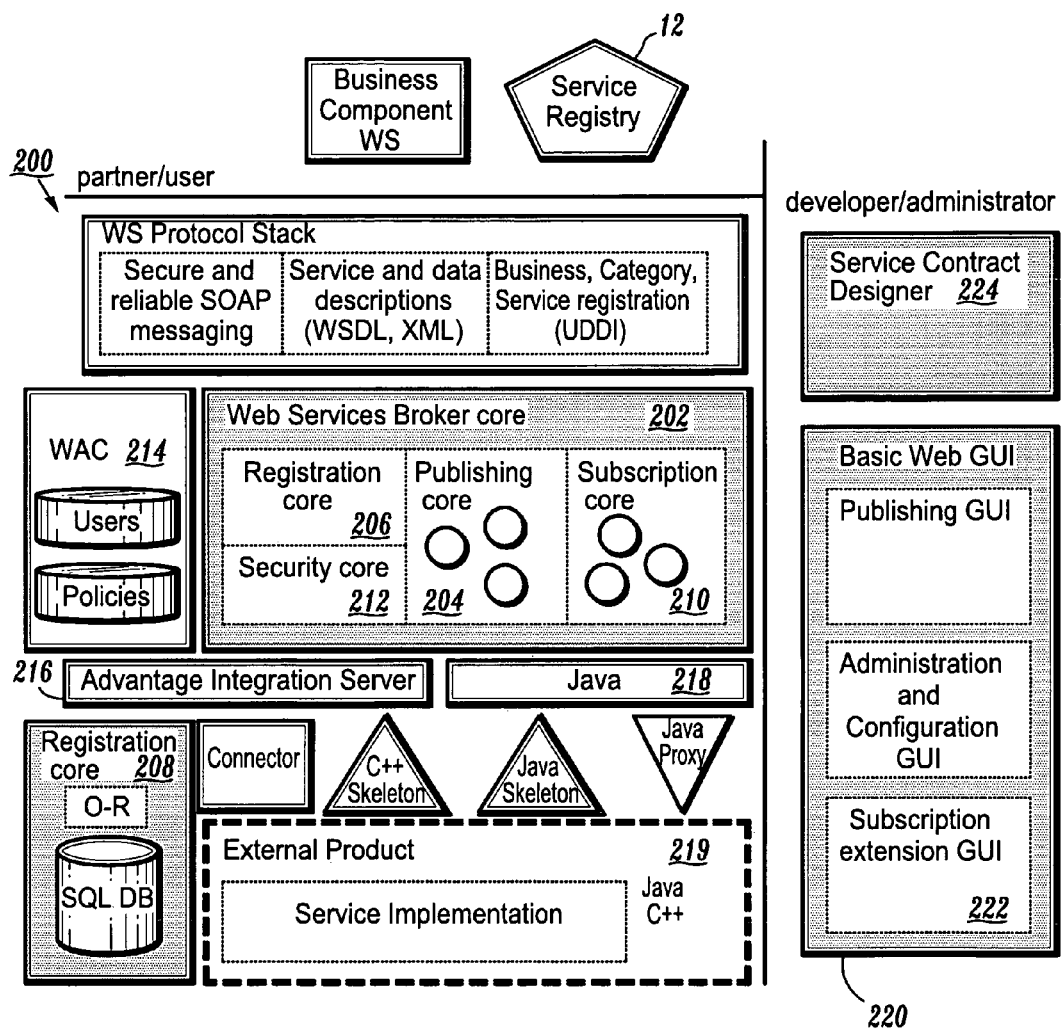
FIG. 7 is a block diagram of an example of another embodiment of a web services broker.

FIG. 7 depicts a Web Services Broker (WSB) as a Common Component, referred to generally as Common Component Broker (CCB) 200 that enables existing products and technologies as universally interoperable business components or Web Services. CCB 200 also offers platform and implementation neutral model-driven construction of the Web Services (WS).

Examples of some of the application scenarios for which CCB 200 would be applicable include enabling an existing product for a WS platform such as, for example, .NET or J2EE/JAXP environment; when an existing product will benefit from integrating with external WS (e.g. .NET Hailstorm Calendar service); when a new WS is to be constructed according to a desired Public Service Contract, etc. In general, it is noted that in a few years many business automation systems, user interface devices and development tools are likely to be WS-enabled. However, presently there is a desire to enable the existing technologies and products for universal interoperability as WS. CCB 200 addresses this need with packaged engines and tools that are not tied to any specific platform and do not require an application server or any other products to run.

CCB 200 can make use of open source technologies. For example, CCB 200 may make us of, Apache Axis as a common SOAP protocol stack, Apache Tomcat might be used to carry out the HTTP communication, etc.

FIG. 7 depicts a diagram of the architecture of the CCB 200. Web Services Broker Core 202 maintains a pool of published and subscribed WS. Published WS are dynamically enabled at runtime by call processors which are mapped into the actual service implementation either directly (e.g., for cases such as a Java class, etc.) or via, for example, Advantage IS integration (e.g., for more extensive OO encapsulation and for C++ implementations, etc,). The subscribed WS are mapped at runtime into operable dynamic proxies which client-side static proxies can call using, for example, Java RMI.

The following components may be included in CCB 200 for implementing various aspects of the present disclosure. Publishing core 204 processes requests over Internet protocols, invokes actual service implementation, generates WS descriptions. Publishing core 204 may also include a set of well-defined APIs and a repository data model. Publishing core 204 may take care of transaction aggregation, data connections, security and other details. The Publishing core may implement invocation plug-ins for Advantage IS objects, Java classes, etc.

Registration core 206 may register WS in a public/corporate service registry and may maintain and synchronizes the registration information in the repository 208 and in the service registry 12.

Subscription core 210 can discover WS in a public service registry, interrogate WS description, bind subscribed WS to a language implementation (such as, for example, Java), generate and send requests over Internet protocols to the subscribed WS. Subscription core 210 may also include a set of well-defined APIs for taking care of transactions, security and other details. Binding a subscribed WS may generate a client proxy in Java or an Advantage IS connector.

Security core 212 can be security system such as, for example, an eTrust WAC client that integrates with the Publishing core 204, Subscription core 210 and Registration core 206 to carry out authentication/authorization procedures. Security core 212 may also encrypt/decrypt and sign/verify messages if desired.

Repository 208 may be an SQL database and may include an object-to-relational mapper implemented as, for example, an Advantage IS connector. Repository 208 may keep and organize information about published and subscribed services, transaction and communication logs, system configuration parameters, etc. Repository 208 may also function as a main control center for the CCB 200. For example, an application can simply drop a new service implementation descriptor object into Repository 208 to deploy and activate a WS. CCB 200 can then pick the events up from the Repository 208.

Web Access Control (WAC) 214 may be a security system such as eTrust for providing a centralized policy-based authorization and authentication server. WAC 214 may use an LDAP Directory as a repository of user/group identities. WAC 214 may provide administrative tools for security policy administration and creation/deletion of users/groups, etc.

An Enterprise Application Integration layer 216 such as an Advantage Integration Server may be utilized to unify data sources and provide transaction/connection aggregation, event management, object caching, load balancing, messaging, wrap C++ service implementations, etc.

Java 218 may run CCB 200 and provide access to Web Service implementations in Java as well as host client proxies for the subscribed Web Services.

External products 219 may provide service implementations mapped to/wrapped by C++ or Java skeletons. External products 219 may also consume (use) client proxies generated for subscribed Web Services.

Basic Web GUI 220 may be a Web-based user interface that allows browsing for service implementation (e.g., Java or Advantage IS) and publishing a WS with a selected implementation (e.g., a Publishing GUI). GUI 220 may also allow listing currently published and subscribed services, modify their execution/registration parameters at runtime, monitor current transactions, analyze communication logs, display performance graphs, etc. (e.g., an Administration and Configuration GUI). Global configuration may include service registry specification, business/categories registration, network proxy information, etc.

A Subscription Extension GUI 222 may be provided as a wizard-like user interface process that allows querying public/corporate service registries for a specific WS. The system can then generate Java class or an EJB proxy that encapsulates a WS for the client use. The system may also be able to make the client WS proxy available as, for example, an Advantage IS object ford binding to other languages such as C++ or VB, etc.

A Service Contract Designer 224 can take a UML (or UML-like) model of a Service Contract (expressed in data structures and interfaces) and create a WS definition (e.g., WSDL). The WSDL definition can then be used as vertical WS standards for any particular subject area. WSDL call be submitted to standards bodies. A designer can then generate an implementation skeleton in Java or C++ that conforms to an original service contract.

The present disclosure may be conveniently implemented using one or more conventional general purpose digital computers and/or servers programmed according to the teachings of the present disclosure. Appropriate software coding can be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of these teachings.

What is claimed is:

1. A web service broker method comprising:
providing an interface on a computer system between an enterprise system and at least one of a service client and a service provider;
providing the interface on the computer system between an enterprise and at least one of a service client and a service provider, the service client discovering web services on a service registry and using corresponding web services from the service provider;
using a processor on the computer system as a web service broker at the interface to:
create and host, at the interface, an object-oriented model representation of each of the web services stored in the service registry, wherein creating the object-oriented model representation at the interface comprises:
interrogating Web Services Description Language from the service provider, the Web Services Description Language identifying at least one of a data type definition or a protocol associated with each of the web services; and
creating the object-oriented model representation based on one or more technical details obtained from interrogating the Web Services Description Language;
deploy each of the web services based on the object-oriented model representation hosted at the interface;
communicating information between the enterprise and the at least one of the service client and the service provider; and
converting information communicated from the enterprise to the service client or the service provider from a first XML message form appropriate for the enterprise to a second XML message form appropriate for the at least one of the service client or the service provider.

2. The web services broker method as recited in claim 1, wherein the enterprise comprises a software product.

3. The web services broker method as recited in claim 2, wherein the web services broker is provided for enabling the software product for a web service platform.

4. The web service broker method as recited in claim 1, further comprising generating, at the interface, a technical description for a web service.

5. The web service broker method as recited in claim 1, further comprising converting the information from a XML data representation to an object-oriented model representation.

6. The web service broker method as recited in claim 1, further comprising translating nested elements in an XML data representation into an object that contains another object.

7. The web service broker method as recited in claim 1, wherein the interface is further operable to:
receive a request from the service provider to publish a new web service;
manipulate an existing object-oriented model to develop an aggregate object-oriented model for the new web service; and
store the aggregate object-oriented model.

8. A computer recording medium including computer executable code for implementing a web service broker, the computer recording medium comprising:
code for providing an interface between an enterprise and at least one of a service client and a service provider, the service client discovering web services on a service registry and using corresponding web services from the service provider;
code for using a web service broker at the interface to:
create and host, at the interface, an object-oriented model representation of each of the web services stored in the service registry, wherein creating the object-oriented model representation at the interface comprises:
interrogating Web Services Description Language from the service provider, the Web Services Description Language identifying at least one of a data type definition or a protocol associated with each of the web services; and
creating the object-oriented model representation based on one or more technical details obtained from interrogating the Web Services Description Language;
deploy each of the web services based on the object-oriented model representation hosted at the interface;
code for communicating information between the enterprise and the at least one of the service client and the service provider; and
code for converting information communicated from the enterprise to the service client or the service provider from a first XML message form appropriate for the enterprise to a second XML message form appropriate for the at least one of the service client or the service provider.

9. The computer recording medium as recited in claim 8, wherein the enterprise compromises a software product.

10. The computer recording medium as recited in claim 9, wherein the web services broker is provided for enabling the software product for a web service platform.

11. The computer recording medium as recited in claim 8, further comprising code for generating, at the interface, a technical description for a web service.

12. The computer recording medium as recited in claim 8, further comprising code for converting information from a XML data representation to an object-oriented model representation.

13. The computer recording medium as recited in claim 8, further comprising code for translating nested elements in an XML data representation into an object that contains another object.

14. The computer recording medium as recited in claim 8, further comprising:
code for receiving a request from the service provider to publish a new web service;
code for manipulating an existing object-oriented model to develop an aggregate object-oriented model for the new web service; and
code for storing the aggregate object-oriented model.

15. A web service broker system comprising:
an enterprise
a service client operable to discover web services on a service registry;

a web services provider operable to provide one or more web services to the service registry;

a service broker comprising an interface between the enterprise and at least one of the service client and the service provider, the service broker operable to:

create and host, at the interface, an object-oriented model representation of each of the web services stored in the service registry, wherein creating the object-oriented model representation at the interface comprises:

interrogating Web Services Description Language from the service provider, the Web Services Description Language identifying at least one of a data type definition or a protocol associated with each of the web services; and creating the object-oriented model representation based on one or more technical details obtained from interrogating the Web Services Description Language;

deploy each of the web services based on the object-oriented model representation hosted at the interface;

communicate information between the enterprise and at least one of the service client and the service provider; and convert information communicated from the enterprise to the service client or the service provider from a first XML message form appropriate for the enterprise to a second XML message form appropriate for the at least one of the service client or the service provider.

16. The web services broker system as recited in claim 15, wherein the enterprise comprises a software product.

17. The web services broker system as recited in claim 16, wherein the web services broker is provided for enabling the software product for a web service platform.

18. The web service broker system as recited in claim 15, wherein the service broker is further operable to generate, at the interface, a technical description for a web service.

19. The web service broker system as recited in claim 15, wherein the service broker is operable to convert information from a XML data representation to an object-oriented model representation.

20. The web service broker system as recited in claim 15, wherein the service broker is operable to translate nested elements in an XML data representation into an object that contains another object.

21. The web service broker system as recited in claim 15, wherein service broker is further operable to:

receive a request to publish a new web service;

manipulate an existing object-oriented model to develop an aggregate object-oriented model for the new web service; and store the aggregate object-oriented model.

* * * * *